US012062875B2

(12) United States Patent
Klingler et al.

(10) Patent No.: US 12,062,875 B2
(45) Date of Patent: Aug. 13, 2024

(54) INTEGRATED CABLE PROCESSING DEVICE

(71) Applicant: TE Connectivity Germany GmbH, Bensheim (DE)

(72) Inventors: Dominik Klingler, Bensheim (DE); Markus Strelow, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/720,884

(22) Filed: Apr. 14, 2022

(65) Prior Publication Data

US 2022/0336968 A1 Oct. 20, 2022

(30) Foreign Application Priority Data

Apr. 15, 2021 (DE) ........................ 102021109486.0

(51) Int. Cl.
*H01R 4/18* (2006.01)
*H01R 43/048* (2006.01)

(52) U.S. Cl.
CPC ............. *H01R 4/188* (2013.01); *H01R 4/184* (2013.01); *H01R 43/048* (2013.01)

(58) Field of Classification Search
CPC . H01R 4/01; H01R 4/18; H01R 4/184; H01R 4/188; H01R 4/20; H01R 4/2404; H01R 4/2416; H01R 4/2454; H01R 4/2462; H01R 7/2466; H01R 4/2491; H01R 4/2495; H01R 11/28; H01R 12/59; H01R 12/67; H01R 12/65
USPC ...... 174/74 R, 78, 84 R, 84 C, 88 R; 439/98, 439/877, 882
See application file for complete search history.

(56) References Cited

U.S. PATENT DOCUMENTS

| | | | | |
|---|---|---|---|---|
| 2,904,619 A * | 9/1959 | Forney, Jr. | H01R 4/20 | 174/75 C |
| 3,200,190 A * | 8/1965 | Forney, Jr. | H01R 4/20 | 174/75 C |
| 5,051,543 A * | 9/1991 | McGuire | H01R 43/042 | 29/862 |

(Continued)

FOREIGN PATENT DOCUMENTS

| | | |
|---|---|---|
| EP | 3460916 A1 | 3/2019 |
| EP | 3528343 A1 | 8/2019 |

(Continued)

OTHER PUBLICATIONS

Extended European Search Report dated Sep. 12, 2022 corresponding to Application No. 22165146.6-1201, 12 pages.

(Continued)

*Primary Examiner* — William H. Mayo, III
(74) *Attorney, Agent, or Firm* — Barley Snyder

(57) ABSTRACT

An electrical crimp ferrule includes a circumferential center portion, a first circumferential flank connected to the center portion, and a second circumferential flank connected to the center portion. The circumferential center portion integrally connects the first and second circumferential flanks. At least one crimp diameter compensation element extends from at least one of the first circumferential flank or the second circumferential flank and is adapted to engage with an electrical cable having a non-circular cross section in a crimped state of the ferrule.

17 Claims, 8 Drawing Sheets

(56) References Cited

U.S. PATENT DOCUMENTS

| | | | | |
|---|---|---|---|---|
| 10,468,786 | B2 | 11/2019 | De Cloet et al. | |
| 2013/0130565 | A1 | 5/2013 | Onuma et al. | |
| 2020/0142040 | A1 | 5/2020 | Pardhan et al. | |
| 2022/0029364 | A1 * | 1/2022 | De Cloet | H01R 9/0518 |

FOREIGN PATENT DOCUMENTS

| | | | | | |
|---|---|---|---|---|---|
| JP | H5500746 | W | | 2/1993 | |
| JP | 2002216916 | A | | 8/2002 | |
| JP | 2017168440 | A | | 9/2017 | |
| JP | 2020092063 | A | * | 6/2020 | F27B 7/383 |
| JP | 2020092063 | A | | 6/2020 | |
| WO | 9104598 | A1 | | 4/1991 | |
| WO | 2013118320 | A1 | | 8/2013 | |
| WO | 2019154788 | A1 | | 8/2019 | |
| WO | 2020129665 | A1 | | 6/2020 | |

OTHER PUBLICATIONS

Japanese Office Action dated Sep. 12, 2023 with English translation, corresponding to Application No. 2022-065517, 8 pages.
Office Action from Japan's Patent Office dated Apr. 18, 2023 with English translation thereof, corresponding to Application No. 2022-065517, 16 pages.

* cited by examiner

Fig. 12 (II)

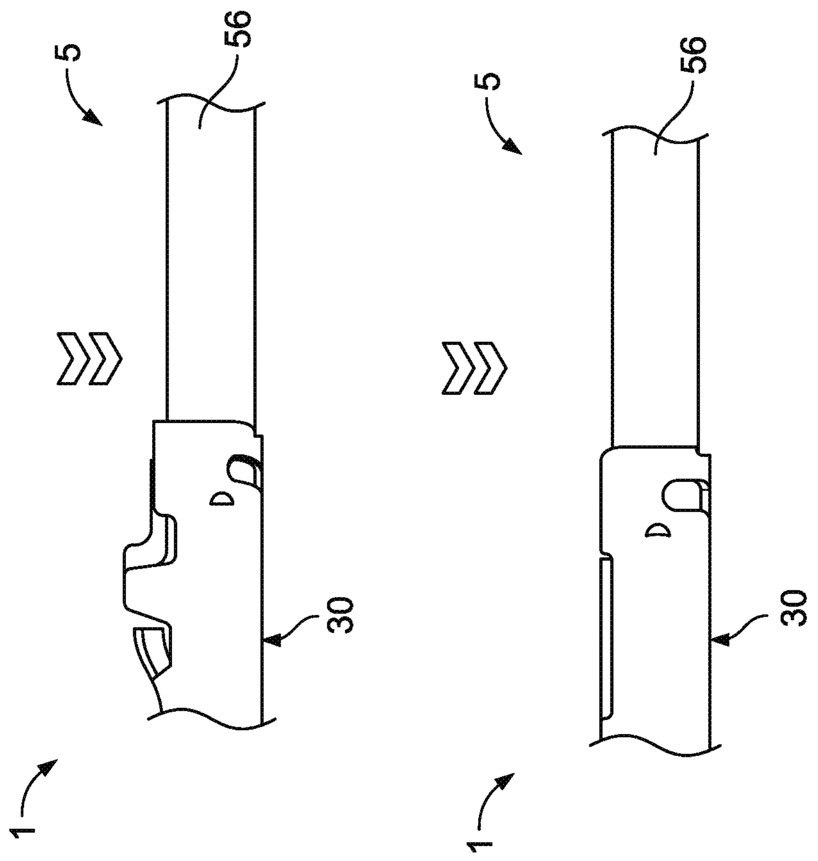
Fig. 13 (Ⅲ)

INTEGRATED CABLE PROCESSING DEVICE

CROSS-REFERENCE TO RELATED APPLICATIONS

This application claims the benefit of German Patent Application No. 102021109486.0 filed on Apr. 15, 2021, the whole disclosure of which is incorporated herein by reference.

FIELD OF THE INVENTION

Embodiments of the present disclosure generally relate to electrical connectors, and more particularly, to an electrical crimp ferrule for an electrical connecting device of an electrical multi-core cable.

BACKGROUND

In the electrical sector (electronics, electrical engineering, electrics, electric energy technology, etc.), a large number of electric connector means or connector devices, socket, pin and/or hybrid connectors, etc. are known. These elements are referred to herein as connectors or mating connectors that serve to transmit electrical currents, voltages, signals and/or data with a wide range of currents, voltages, frequencies and/or data rates. In the area of low, medium or high voltages and/or currents, and in particular in the vehicle sector, such connectors have to ensure transmission of electrical power, signals and/or data permanently, repeatedly and/or for a short time after a comparatively long period of inactivity in mechanically stressed, warm, possibly hot, contaminated, damp and/or chemically aggressive environments.

As a result of the wide range of applications, a large number of specially designed connectors are known. Such a connector and, if applicable, its associated or higher-level housing can be fitted to an electrical line, a cable, a cable harness etc., or to/in an electrical device or means, such as to/in a housing, to/on a leadframe, to/on a circuit board etc., of an electrical, electro-optical or electronic component or a corresponding assembly or device. If a connector is located on a cable, a line or a cable harness, it may be referred to as a flying connector or plug, a socket or a coupling. If a connector is located on/in an electrical, electro-optical or electronic component, aggregation etc., it may be referred to as a connector device, such as a connector, a plug or a socket. A connector on such a device is further often also referred to as a receptacle, pin header, pin strip or header. In the context of electrical power engineering (generating, converting, storing and transporting high-voltage electrical current in electricity grids, preferably with three-phase high-voltage transmission), the term cable fittings is used as a result of their comparatively complex structure.

Regardless of the application or a specific configuration, a connector has to ensure proper transmission of electricity, wherein mutually corresponding and partially complementary connectors (connector and mating connector) usually have locking devices and/or fastening devices for permanent but generally releasable locking and/or fastening of the connector to/in the mating connector or vice versa. An electrical connecting device for a connector, for example, comprising or at least having an actual electrical contact means (e.g., a terminal) also has to be held securely therein.

A connecting device may be formed from several parts. In particular, a connecting device may comprise or have two or more electrical terminals. This is the case with coaxial or twinaxial or twisted-pair connecting devices which may comprise or have one or two inner, electrical terminals (male and/or female) and one outer terminal (shield contact sleeve). Furthermore, a ferrule or support sleeve may be applied within the outer terminal in the connecting device. In the case of a preassembled electrical cable, such a connecting device may be provided as a connector without a housing, for example in a flying manner.

Efforts are continually being made to improve electrical connectors and their connecting devices, in particular due to miniaturization to make them more robust, design them more effectively and produce them at lower cost. Here, rules apply to hf-connecting devices (hf: high-frequency, definition here: transmission frequencies greater than 3 to greater than 300 MHz and well into the GHz range (about 150 GHz)) that are considerably different to those for conventional connecting devices (i.e., transmission frequencies lower than about 3 MHz). This is the result of the wave properties of electricity in hf-technology in particular. In the case of electrical hf-plug connections, maintaining signal integrity is proving to be an ever greater obstacle.

There is an observable trend for cable manufacturers to make the shields in multi-core cables, such as twisted-pair cables, twinaxial cables etc. increasingly more oval because more and more manufacturers are laying the shields of the multi-core cables directly around the inner conductors of the multi-core cables instead of around additional fillers as before. However, the insulation sheaths of the multi-core cables remain substantially circular. The conventional crimp ferrules for crimp connecting devices of such multi-core cables are designed in such a way that they are suitable only for being crimped onto a substantially circular shield.

Therefore, an object of the of the present disclosure includes an improved connecting device or ferrule addressing the above deficiencies.

SUMMARY

According to an embodiment of the present disclosure, an electrical crimp ferrule includes a circumferential center portion, a first circumferential flank connected to the center portion, and a second circumferential flank connected to the center portion. The circumferential center portion integrally connects the first and second circumferential flanks. At least one crimp diameter compensation element extends from at least one of the first circumferential flank or the second circumferential flank and is adapted to engage with an electrical cable having a non-circular cross section in a crimped state of the ferrule.

BRIEF DESCRIPTION OF THE DRAWINGS

The invention will now be described by way of example with reference to the accompanying Figures, of which:

FIGS. 11-13 illustrate three steps of a method for assembling an electrical connecting device to/on a multi-core cable according to an embodiment of the present disclosure.

DETAILED DESCRIPTION OF THE EMBODIMENTS

Figure 2:
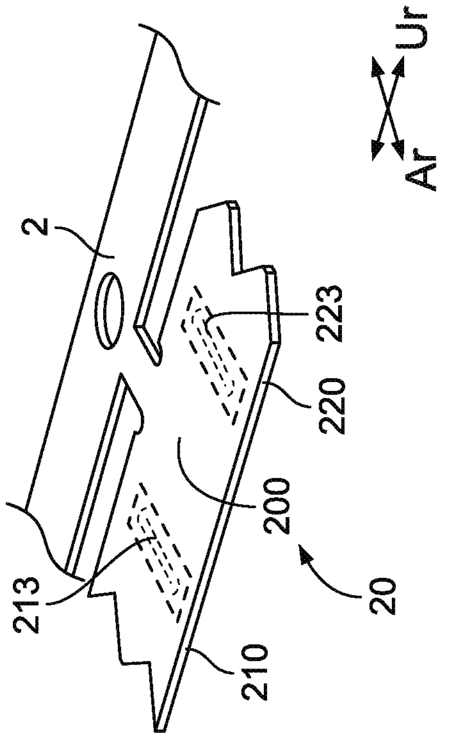
FIGS. 1 and 2 are perspective views illustrating a crimp ferrule according to the present disclosure in an unbent state.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure are explained in more detail below on the basis of exemplary embodiments of one embodiment (FIGS. 1-6) of a variant of a crimp ferrule 20 according to the invention, in particular an hf-crimp ferrule 20, for an electrical connecting device 1 of an electrical multi-core cable 5; and two embodiments (FIGS. 9 and 10) of a method for ferrule mounting an electrical crimp ferrule 20, in particular an hf-crimp ferrule 20, on an electrically stripped inner cross section 50 of a multi-core cable 5. In this case, the multi-core cable 5 may be formed e.g., as a twisted-pair cable, a twinaxial cable etc. Accordingly, the connecting device 1 may be formed as a multi-core connecting device 1, such as a twisted-pair connecting device 1, a twinaxial connecting device 1, and the crimp ferrule 20 may be formed as a multi-core crimp ferrule 20, such as a twisted-pair crimp ferrule 20, a twinaxial crimp ferrule 20.

Although the invention is described and illustrated further in greater detail by way of preferred exemplary embodiments, the invention is not restricted by way of the disclosed exemplary embodiments, but rather is of more fundamental nature. Other variations can be derived therefrom, without departing from the scope of protection of the invention. The invention can be used in general in the electrical sector in the case of an electrical entity or device. One exception is formed here by terrestrial electrical power engineering. The drawing shows only those spatial portions of the subject matter of the invention which are necessary for understanding of the invention. Designations such as connector and mating connector, terminal and mating terminal etc., are to be interpreted synonymously, or may be mutually interchangeable.

FIGS. 1-6 illustrate two formerly identical crimp ferrules 20 in three different states (FIGS. 1 and 2, FIGS. 3 and 4, and FIGS. 5 and 6). In the present case, a crimp ferrule 20 is defined in such a way that a crimp ferrule 20 has either at least one crimp diameter compensation means or element 212, 222; or a crimp ferrule 20 has had at least one crimp diameter compensation means 212, 222, i.e., has at least one former crimp diameter compensation means 213, 223.

The former crimp diameter compensation means 213, 223 can be identified, for example, as a residual of a crimp diameter compensation means 212, 222 on/in the crimp ferrule 20. For example, FIG. 2 shows a crimp ferrule 20 having residual elements of the crimp diameter compensation means 212, 222. In distinction, FIG. 10 (left most figure) does not show a crimp ferrule 20 within the meaning of the present disclosure, as neither a crimp diameter compensation means or a former crimp diameter compensation means is present.

A single crimp ferrule 20 is preferably formed from a substantially single material layer 200, 210, 220 (i.e., a sheet) and comprises a circumferential center portion 200 which preferably integrally connects a (first) circumferential flank 210 of the crimp ferrule 20 to a (second) circumferential flank 220 of the crimp ferrule 20. A center of the circumferential center portion is preferably situated opposite a crimp opening (see FIGS. 3 and 4) or a crimp slot (see FIGS. 5 and 6) of the crimp ferrule 20. The crimp ferrule 20 further has an extent (or projection extending) in the axial direction Ar, which also corresponds to an axial direction Ar of the connecting device 1 and the multi-core cable 5. The crimp ferrule 20 further has, depending on its state (see below), an extent in the radial direction Rr and an extent in the circumferential direction Ur. The directions Rr, Ur correspond to those of the connecting device 1 and the multi-core cable 5.

Figure 1:
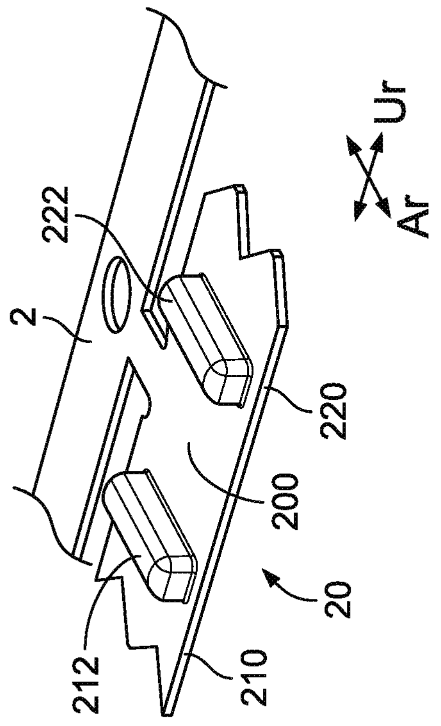
Figure 4:
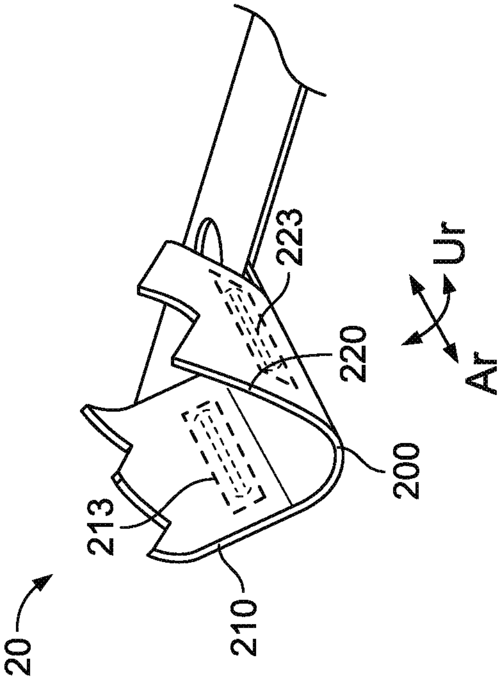
FIGS. 3 and 4 are perspective views illustrating the crimp ferrule according to the present disclosure in a pre-bent state immediately before crimping.
Figure 3:
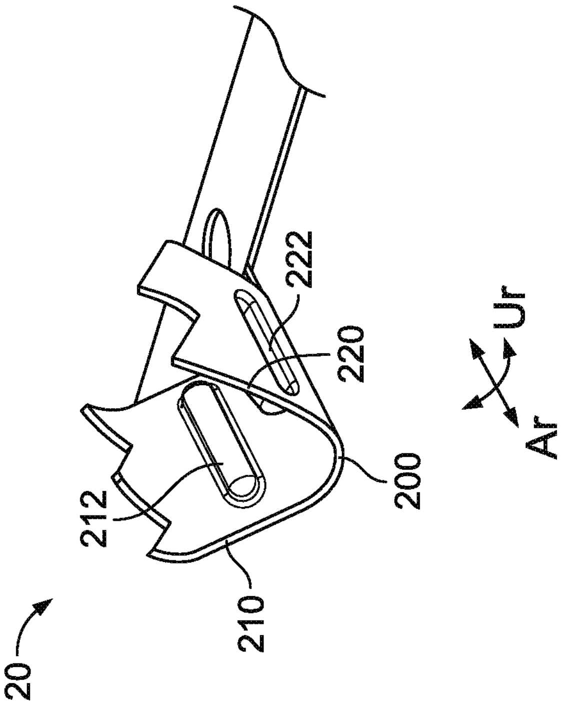
Figure 6:
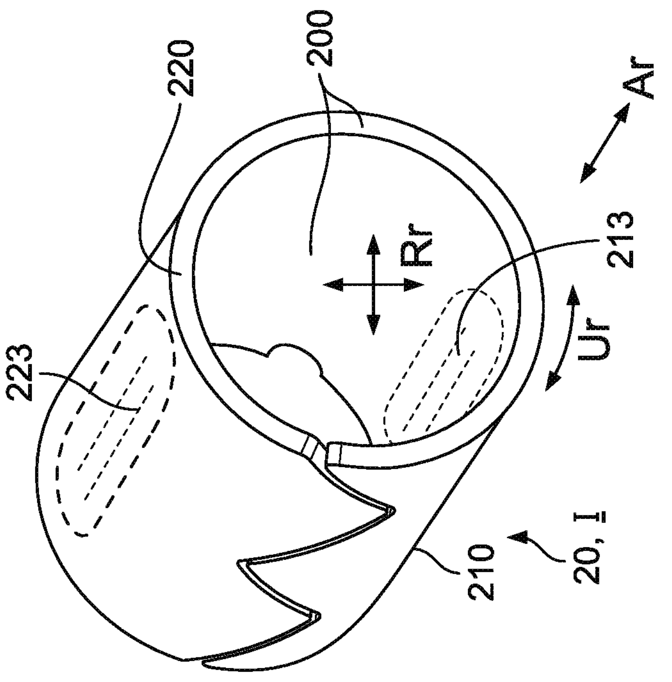
FIGS. 5 and 6 are perspective views illustrating the crimp ferrule according to the present disclosure in a crimped state.
Figure 5:
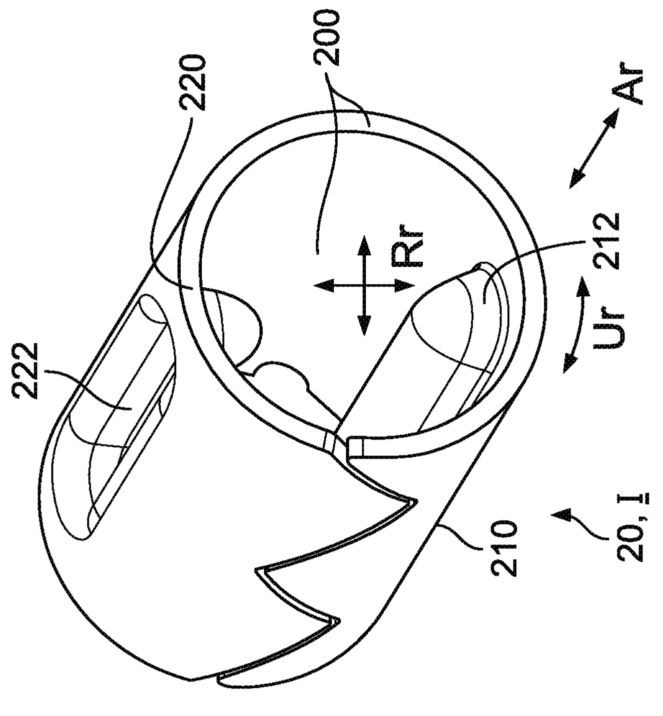
Figure 8:
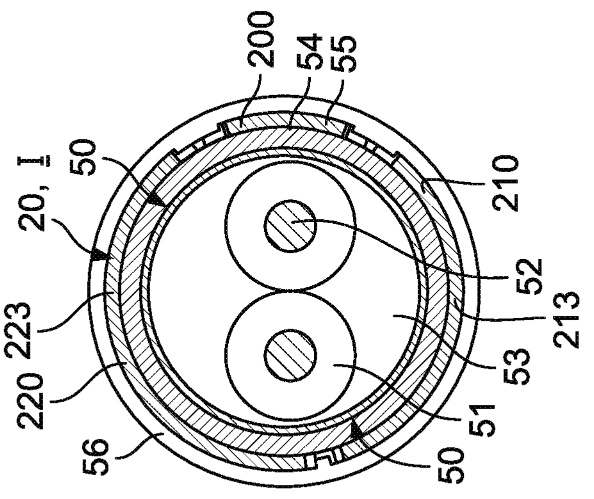
FIGS. 7 and 8 are cross sectional views of the crimp ferrule according to the present disclosure in the crimped position on both a cable having a non-circular inner cross section and a circular inner cross section, respectively.
Figure 7:
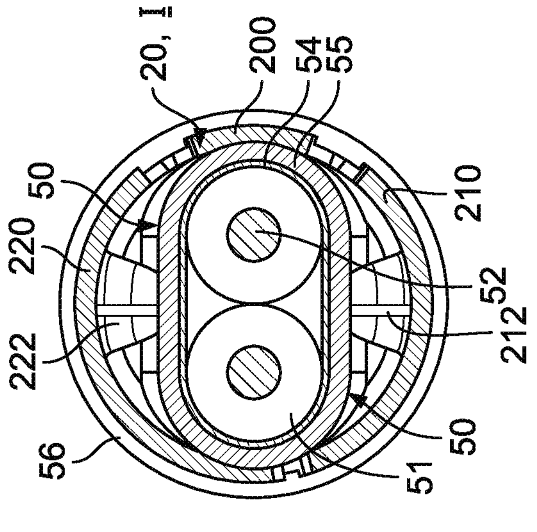
Figure 9:
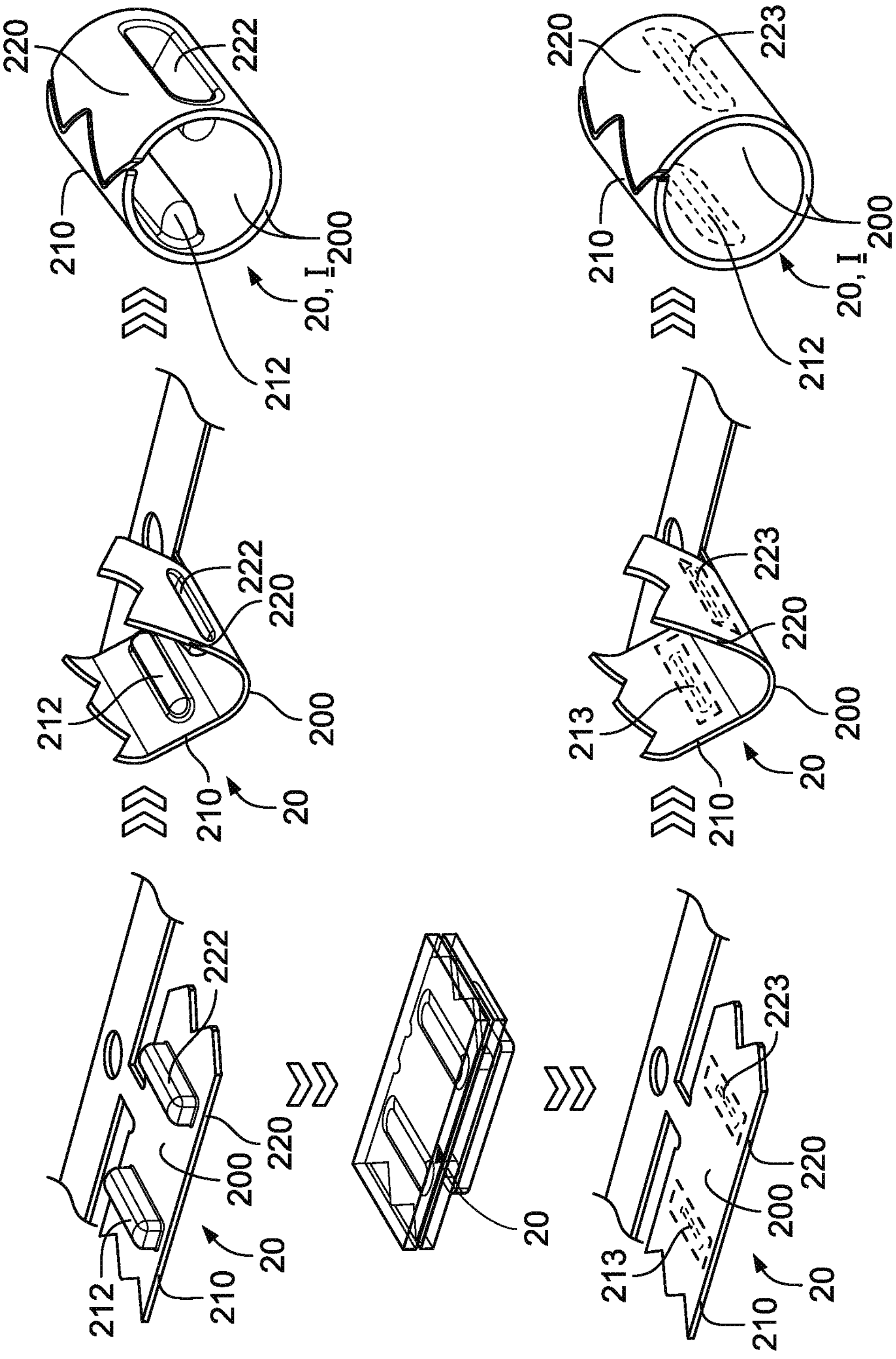
FIGS. 9 and 10 illustrate a method of mounting the ferrule according to the preceding figures onto an electrically stripped inner cross section of a multi-core cable.

FIGS. 1 and 2, FIGS. 3 and 4 and FIGS. 5 and 6 respectively show two formerly identical crimp ferrules 20 in each case in different states for the method illustrated in FIG. 9. FIGS. 1 and 2 each show the crimp ferrules 20 in an unbent state. FIGS. 3 and 4 each show the crimp ferrules 20 in a pre-bent state e.g., immediately before crimping. FIGS. 5 and 6 each show the crimp ferrules 20 in a crimped state (without multi-core cables 5). The crimp ferrule 20 of FIGS. 1, 3 and 5 is adapted to be crimped onto a non-circular inner cross section 50 of the multi-core cable 5 (see FIG. 7). The crimp ferrule 20 of FIGS. 2, 4 and 6 is adapted to be crimped onto a circular inner cross section 50 of the multi-core cable 5 (see FIG. 8).

These formerly identical crimp ferrules 20 differ in that that crimp ferrule 20, which was originally suitable for being crimped onto the non-circular inner cross section 50 of the multi-core cable 5 (FIGS. 1, 3 and 5), has been changed such that it is now suitable for being crimped onto the circular inner cross section 50 of the multi-core cable 5 (FIGS. 2, 4 and 6). The resulting crimp ferrule 20 in question can be crimped onto a cable shield 54, 55 of the multi-core cable 5. In the exemplary embodiment, the cable shield 54, 55 comprises a shield film 54 and/or a shield conductor 55 or a shield conductor braid 55.

The crimp diameter compensation means 212, 222 is formed or established on/in the crimp ferrule 20 in such a way that the crimp ferrule, in addition to its required extents in the axial direction Ar and in the circumferential direction Ur, preferably projects inwards into the crimp ferrule 20 in the radial direction Rr (FIGS. 3 and 5). A crimp diameter compensation means 212, 222 pointing outwards in the radial direction Rr or projecting away from the crimp ferrule 20 may also be used.

The at least one crimp diameter compensation means 212, 222 ensures that an outer shape (outer contour) of a crimp ferrule 20, which is intended to be crimped onto a non-circular inner cross section 50 of a multi-core cable 5, remains substantially circular (because an outer shape of the multi-core cable 5 is substantially circular and/or for another reason) after crimping. Specifically, the at least one crimp diameter compensation means 212, 222 is formed or established on/in the crimp ferrule 20 in such a way that, by means of the crimp diameter compensation means, a non-circular inner cross section 50 different from a circular inner cross section 50 is changed to a mainly or substantially circular cross section (outer shape of the crimp ferrule 20) on the outside of the crimp ferrule 20.

In the case of radial Rr dimensioning of the crimp diameter compensation means 212, 222, it is necessary to take into account a radial Rr thickness of the crimp ferrule 20. Further, a radial Rr thickness of the crimp diameter compensation means 212, 222, in particular substantially only in its center in the circumferential direction Ur, is the size of a distance between a relatively small radius of the inner cross section 50 and a relatively large radius of this inner cross section 50, in particular a distance between a minimum radius (i.e., a minor axis radius in the case of an ellipse) of the inner cross section 50 and a maximum radius (i.e., a major axis radius in the case of an ellipse) of this inner cross section 50.

In a preferred embodiment, precisely two or at least two crimp diameter compensation means 212, 222 are formed or established on/in the crimp ferrule 20. More than two crimp diameter compensation means 212, 222 may possibly also be used. The crimp diameter compensation means 212, 222 are provided rotationally symmetrically, in particular rotationally symmetrically through 180°, with respect to the axial direction Ar as the rotation axis on/in the crimp ferrule 20. The crimp diameter compensation means 212, 222 is formed as a projection projecting radially outwards away from the crimp ferrule 20. The crimp diameter compensation means 212, 222 may be formed as a longitudinal bead running substantially in a longitudinal direction of the crimp ferrule 20. This bead may be established or have been established with both of its longitudinal ends inside the crimp ferrule in the longitudinal direction. This bead can further be established or have been established with both of its circumferential ends inside the crimp ferrule in the circumferential direction of the crimp ferrule.

A free edge of the crimp ferrule 20 extending in the longitudinal direction can be substantially free of an extent substantially solely in the longitudinal direction. As a result, the hf-properties (signal integrity) of the crimp ferrule are improved. The free edges of the crimp ferrule situated opposite each other in the circumferential direction can be formed in a complementary manner and, in the crimped state of the crimp ferrule 20, situated opposite each other substantially in a form-fitting manner. In addition, in the crimped state of the crimp ferrule 20, a circumferential tooth (e.g., triangular) of a circumferential flank can engage between two circumferential teeth (e.g., triangular) of the circumferential flank situated opposite the first-said circumferential flank in the circumferential direction. As a result, stranded wires of a shielding braid are captured better when the ferrule is crimped onto the inner cross section.

While a bead or bead-shaped crimp diameter compensation means 212, 222 is illustrated, other shapes are contemplated, such as a rib, a stamped portion, a fold, a dimple, etc. A plurality or a large number of individual devices can, of course, also be used, depending on the crimp diameter compensation means 212, 222. It is also possible to form a single crimp diameter compensation means 212, 222 from a plurality or large number of individual relatively small devices, such as e.g., dimples, or to level these again for the circular inner cross section.

Figure 10:
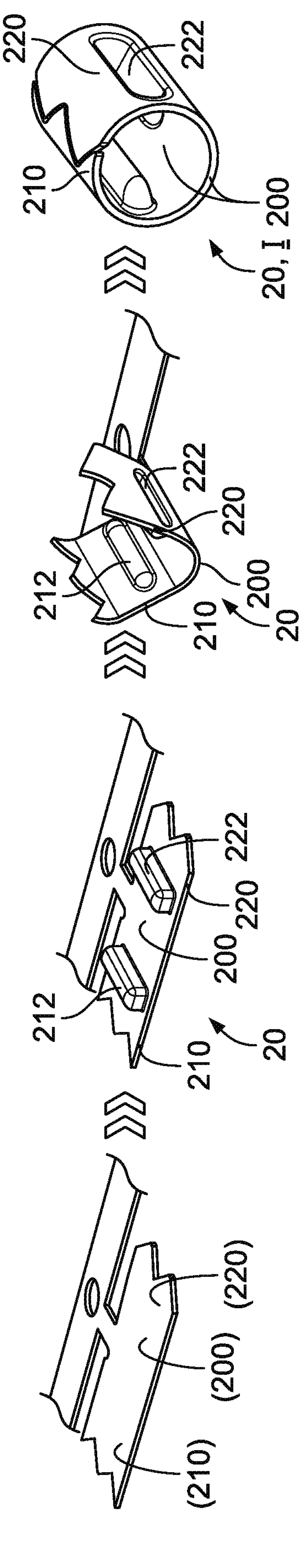

In terms of association with or incorporation into an assembly method of an electrical connecting device 1 at/on a multi-core cable 5, a distinction can be drawn between at least two embodiments for mounting a crimp ferrule 20 according to the invention (ferrule mounting) on an inner cross section 50 of the multi-core cable 5 (FIGS. 9 and 10).

In a first embodiment, the ferrule mounting is illustrated by way of example in FIG. 9. A crimp ferrule 20 with at least one crimp diameter compensation means 212, 222 is always provided, wherein the type of crimp ferrule 20 required is preset or decided upon in each case in a crimping method. Either a crimp ferrule for a substantially non-circular inner cross section 50 (at the top in FIG. 9) or a crimp ferrule for a substantially circular inner cross section 50 (at the bottom in FIG. 9) is chosen.

Figure 11:
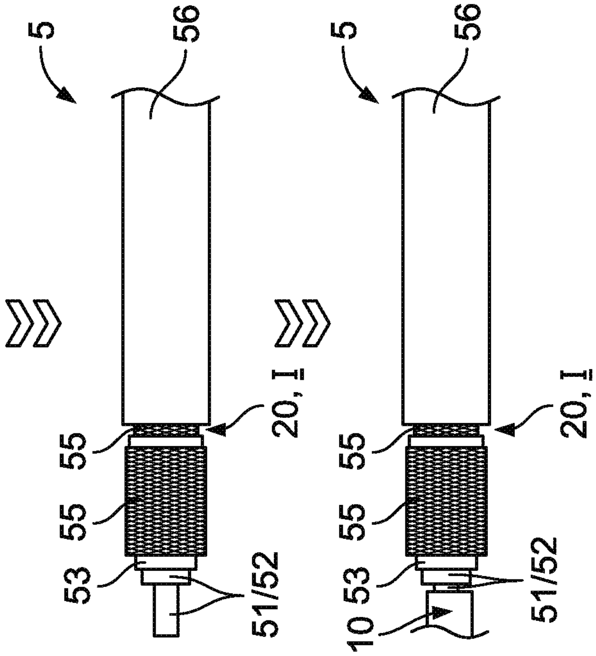
Figure 11:
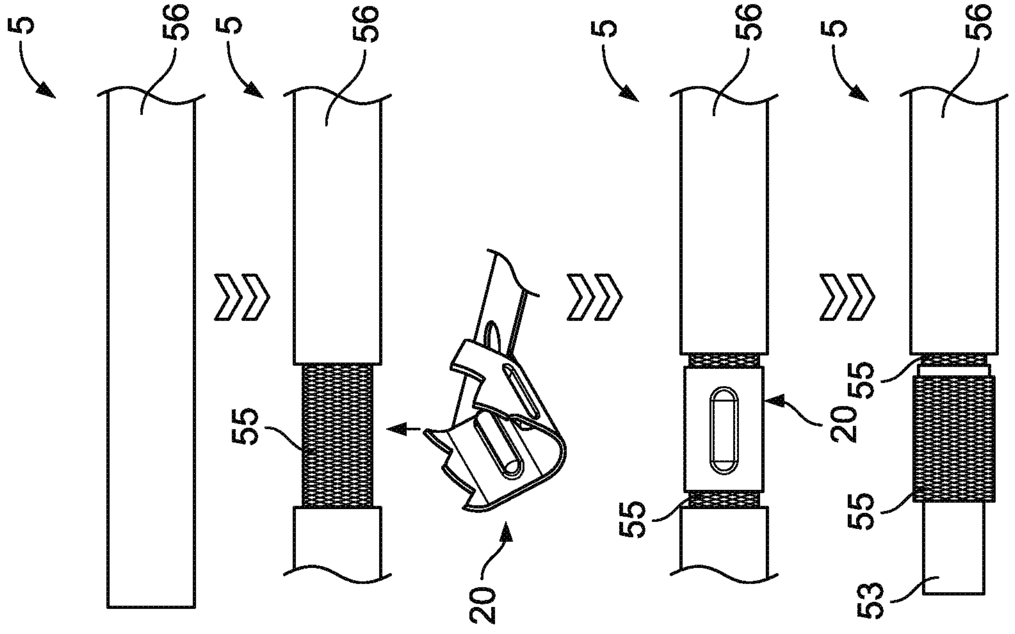

In the first case, a crimp ferrule 20 with at least one crimp diameter compensation means 212, 222 is provided in a feed step and crimped onto a substantially non-circular inner cross section 50 of the multi-core cable 5, which inner cross section is stripped e.g. of a protective sheath 56 of the multi-core cable 5 (i.e., is partially or completely stripped of the protective sheath, e.g., has the protective sheath pulled off or removed) (from top left to (top) right in FIG. 9, and FIG. 11).

In the second case, a crimp ferrule 20 with at least one crimp diameter compensation means 212, 222 is provided in a feed step. This at least one crimp diameter compensation means 212, 222 is then removed from the crimp ferrule 20 (see above, the crimp ferrule 20 now has at least one former crimp diameter compensation means 213, 223). Subsequently, the crimp ferrule 20 is then crimped onto a substantially circular inner cross section 50 of the multi-core cable 5, which cross section is stripped e.g. of a protective sheath 56 of the multi-core cable 5 (from top left to the bottom and from there to the (bottom) right in FIG. 9, analogously to FIG. 11).

The second embodiment for the ferrule mounting illustrated in FIG. 10. Initially a blank of the crimp ferrule 20 (crimp ferrule blank both without at least one crimp diameter compensation means 212, 222 and also without at least one former crimp diameter compensation means 213, 223) is provided. In a preparation step for the ferrule mounting, at least one crimp diameter compensation means 212, 222 is established (e.g., stamped) on/in the crimp ferrule 20 before the feed step. Following this, the crimp ferrule 20 is crimped onto an electrically stripped, substantially non-circular inner cross section 50 of the multi-core cable 5 (FIGS. 10 and 11).

FIGS. 11 to 13 illustrate an embodiment of the assembly method according to the invention for the connecting device 1 at/on the multi-core cable 5, wherein an assembled multi-core cable is obtained. In a first step I (from top to bottom in FIG. 11) of the assembly method, initially partial pulling-off of the protective sheath 56 of the multi-core cable 5 preferably takes place, wherein its cable shield 55 (here shield conductor braid 55) is exposed. The complete pulling off or partial or complete removal can likewise be used. Subsequently, the crimp ferrule 20 is crimped onto this free longitudinal portion (ferrule mounting), wherein the ferrule 20 is substantially preferably plastically deformed.

Ferrule mounting is performed depending on whether the inner cross section 50 of the multi-core cable 5 is substantially non-circular (see FIGS. 1, 3, 5 and 7) or substantially circular (see FIGS. 2, 4, 6 and 8). Following the ferrule mounting, a partially removed longitudinal end portion of the protective sheath 56 is completely removed. Following this, the axial portion of the cable shield 55 projecting under the crimp ferrule 20 in the direction of a free longitudinal end, preferably without the cable shield 54 (shield film 54), is folded over onto the crimp ferrule 20.

In a second step II following the first step I (from top to bottom in FIG. 12) of the assembly method, a remaining free longitudinal end portion of the multi-core cable 5 is prepared for fitting the inner terminals 10. Depending on the multi-core cable 5, a dielectric 53 and/or a possibly respective electrical insulation of the inner conductors 51, 52 of the multi-core cable 5 is removed from a remaining free end portion at a slight distance from the crimp ferrule 20 or the folded-over portion of the cable shield 54. The dielectric 53, in particular apart from the electrical insulations of the inner conductors 51, 52, is preferably present only in the case of multi-core cables 5 which have a substantially circular inner cross section 50 (see FIGS. 7 and 8). Following this, the inner terminals 10 (e.g., two) are fitted to the multi-core cable 5.

In a third step III following the second step II (from top to bottom in FIG. 13) of the assembly method, an outer, electrical crimp terminal 30, in particular a shield contact sleeve 30, can be crimped onto the multi-core cable 5. The shield contact sleeve 30 is crimped onto the crimp ferrule 20 or its folded-over portion of the cable shield 54 and further at the rear onto the protective sheath 56 of the multi-core cable 5. The pre-assembled (at the bottom in FIG. 12) multi-core cable 5 is moved into the shield contact sleeve 30, which is open at the top, from above, or vice versa, and/or into the shield contact sleeve 30, which is open at the rear, from the rear, or vice versa.

Since the trend in the case of high-speed data cables 5, e.g. in the case of multi-core cables 5, is for non-circular (oval, elliptical etc.) inner cross sections 50, the crimp ferrule 20 according to the present disclosure (compensation (crimp) ferrule 20) can be used in considerably more such data cables 5. Embodiments create a mechanically robust, electrically reliable and signal-stable (good signal integrity) cable connection. Furthermore, mechanical crimp forces can be better applied to/introduced into non-circular inner cross sections 50 using the crimp ferrule 20 according to the invention than using a comparable conventional crimp ferrule 20 (without at least one crimp diameter compensation means) for non-circular inner cross sections 50. In particular, the crimp ferrule 20 according to the present disclosure can also be crimped onto an inner cross section 50 of an electromagnetically shielded single-core cable 5, such as the coaxial cable 5.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of the elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. An electrical crimp ferrule, comprising:
- a circumferential center portion;
- a first circumferential flank connected to the center portion;
- a second circumferential flank connected to the center portion, the circumferential center portion integrally connecting the first and second circumferential flanks; and
- at least one crimp diameter compensation element extending from at least one of the first circumferential flank or the second circumferential flank and adapted to engage in a crimped state of the ferrule with an electrical cable having a non-circular cross section, the electrical cable has the non-circular cross section in a uncrimped state of the ferrule, the at least one crimp diameter compensation element is plastically deformable or removable such that the crimp ferrule is adaptable to uniformly engage with an electrical cable having a substantially circular cross section.

2. The electrical crimp ferrule of claim 1, wherein the at least one crimp diameter compensation element comprises two crimp diameter compensation elements.

3. The electrical crimp ferrule of claim 2, wherein each of the first and second circumferential flanks includes one of the two crimp diameter compensation elements.

4. The electrical crimp ferrule of claim 1, wherein the circumferential center portion comprises a uniform cross section having no crimp diameter compensation elements.

5. The electrical crimp ferrule of claim 1, wherein the at least one crimp diameter compensation element comprises a projection extending radially inwards into a receiving portion of the crimp ferrule.

6. The electrical crimp ferrule of claim 5, wherein the at least one crimp diameter compensation element is formed as a raised bead running substantially in a longitudinal direction of the crimp ferrule, each of two longitudinal ends of the at least one crimp diameter compensation element are formed inside the crimp ferrule in the longitudinal direction, and each of two circumferential ends of the at least one crimp diameter compensation element are formed inside the crimp ferrule in the circumferential direction.

7. The electrical crimp ferrule of claim 1, wherein the at least one crimp diameter compensation element is formed integrally with a remainder of the crimp ferrule.

8. The electrical crimp ferrule of claim 1, wherein, in the uncrimped state of the ferrule, the first circumferential flank and the second circumferential flank define complementary free ends adapted to oppose and engage each other in a form-fitting manner in the crimped state of the ferrule.

9. The electrical crimp ferrule of claim 8, wherein the free ends of the first and second circumferential flanks comprise complementary toothing extending in the circumferential direction in the crimped state of the ferrule.

10. A method for mounting an electrical crimp ferrule on an electrically stripped inner cross section of a multi-core cable includes the steps of:

forming at least one crimp diameter compensation element on the ferrule;

positioning the electrical crimp ferrule and the at least one crimp diameter compensation element of the ferrule into a crimping position with respect to the cable; and crimping the ferrule onto an electrically stripped, inner cross section of the cable, the inner cross section of the multi-core cable:

has a non-circular cross section prior to crimping, or has a circular cross section and the at least one crimp diameter compensation element is removed from the ferrule prior to crimping.

11. The method of claim 10, wherein the step of removing the at least one crimp diameter compensation element from the ferrule is performed in a planar or pre-bent state of the ferrule.

12. The method of claim 11, wherein the step of removing the at least one crimp diameter compensation element from the ferrule includes pressing the at least one crimp diameter compensation element out of the ferrule.

13. The method of claim 10, wherein the step of crimping the ferrule includes crimping the ferrule onto a cable shield of the cable.

14. The method of claim 13, further comprising the step of folding the cable shield onto the crimp ferrule after the step of crimping the ferrule onto the inner cross section.

15. The method of claim 10, further comprising the steps of:

fitting inner terminals onto inner conductors of the cable; and crimping a shield contact sleeve onto the ferrule.

16. An electrical assembly, comprising:

an electrical cable;

a crimp ferrule crimped onto the cable, including:

a circumferential center portion;

a first circumferential flank connected to the center portion;

a second circumferential flank connected to the center portion, the circumferential center portion integrally connecting the first and second circumferential flanks; and a crimp diameter compensation projection extending from at least one of the first circumferential flank or the second circumferential flank and engaging in a crimped state of the crimp ferrule a portion of the electrical cable having a radial dimension that is less than a radial dimension of another portion of the cable, the electrical cable has a non-circular cross section in an uncrimped state of the ferrule, the crimp diameter compensation projection is plastically deformable or removable such that the crimp ferrule is adaptable to uniformly engage with another electrical cable having a substantially circular cross section.

17. The electrical assembly of claim 16, wherein the crimp diameter compensation projection comprises a projection extending from each of the first and second circumferential flanks, the crimp diameter compensation projections opposing one another in the crimped state of the ferrule.

* * * * *